United States Patent [19]
Kawai et al.

[11] Patent Number: 5,858,523
[45] Date of Patent: Jan. 12, 1999

[54] POROUS CERAMIC FILM AND PROCESS FOR PRODUCING THE SAME

[75] Inventors: Chihiro Kawai; Takahiro Matsuura; Akira Yamakawa, all of Itami, Japan

[73] Assignee: Sumitomo Electric Industries, Ltd., Japan

[21] Appl. No.: 538,738

[22] Filed: Oct. 3, 1995

[30] Foreign Application Priority Data

Nov. 17, 1994 [JP] Japan .................................. 6-283448
Sep. 22, 1995 [JP] Japan .................................. 7-269138

[51] Int. Cl.$^6$ .................................................. B32B 29/02
[52] U.S. Cl. .................................. 428/312.6; 428/312.8; 428/319.1; 428/325; 428/331; 428/698; 428/701; 428/702; 442/409; 442/410; 427/204; 427/205; 427/350; 427/376.2
[58] Field of Search .................................. 428/688, 698, 428/701, 702, 222, 312.6, 312.8, 319.1, 325, 331, 293.4; 442/409, 410; 427/202, 204, 205, 350, 376.2

[56] References Cited

U.S. PATENT DOCUMENTS 3,513,019  5/1970  Miller et al. .

FOREIGN PATENT DOCUMENTS

| 0371770 | 6/1990 | European Pat. Off. . |
|---|---|---|
| 1667657 | 3/1972 | Germany . |
| 150275 | 6/1991 | Japan . |
| 31174 | 4/1994 | Japan . |
| WO9008732 | 8/1990 | WIPO . |
| WO9014451 | 11/1990 | WIPO . |

OTHER PUBLICATIONS

Y. Kohtoku, et al. The Developments of Ceramics From Amorphous Silicon Nitride; (Cer. Mat. Compon. Engines 1986) pp. 101–108.

Mamoru et al, Patent Abstracts of Japan vol. 13, No. 326 Jul. 24, 1989 Abstract only.

Derwent Publications, Ltd., London, G.B.; 87–068636 & JP–A–62–021769.

Derwent Publications Ltd., London, G.B.; 87–039716 & JP–A–61 295299 Dec. 1986 Abstract only.

Migiwa et al, Patent Abstracts of Japan, vol. 13, No. 326 Apr. 21, 1989 Abstract only.

*Primary Examiner*—Timothy M. Speer
*Attorney, Agent, or Firm*—Bierman, Muserlian and Lucas

[57] ABSTRACT

A porous ceramic film which is formed onto and bonded to an oxide layer provided on the surface of a porous base, the film composed of finely deposited particles comprising at least one compound including (a) at least one selected from the group consisting of Si, B and Al or the group consisting of the metals of the Groups IVa, Va and VIa and (b) at least one selected from the group consisting of C and N in which the particles are intertwined with each other and bonded to each other through the component of the oxide layer to form a three-dimensionally intertwined structure. This porous ceramic film is produced by forming the oxide layer on the base surface and then heating it to a temperature of at least of the liquid-phase formation temperature of the oxide layer in a gaseous atmosphere containing the above elements (a) and (b). The porous ceramic film has a high porosity, a good pressure resistance and a regulated pore size and is appropriate for a filter, a catalyst support, bioreactor or a structural material.

28 Claims, 3 Drawing Sheets

POROUS CERAMIC FILM AND PROCESS FOR PRODUCING THE SAME

BACKGROUND OF THE INVENTION

1. Field of the Invention

This invention relates to a porous ceramic film which has a high porosity, a good pressure resistance and a regulated pore size, and a process for producing the same.

2. Description of the Prior Art

In recent years, there is a growing necessity for filters and catalyst supports having a good heat resistance, a high strength and a high thermal shock resistance. It is believed, for example, a filter or a catalyst support for eliminating $CO_2$, $NO_x$ or black smoke from an automobile exhaust gas should withstand high temperatures exceeding 1,000° C. Similarly, a high thermal resistance is required of a filter for desulfurizing an exhaust gas from a thermal power plant or a chemical plant, a filter for eliminating slugs from a molten metal, etc.

Attempts have been made to apply porous ceramic films to these filters and catalyst supports and some of them have been already put into practical use. It is expected that silicon nitride, which is excellent in strength, toughness, thermal shock resistance, chemical resistance, etc., and thus has been employed as a structural ceramic material, might be useful as a material for producing porous ceramic films.

Attempts have been also made to employ porous ceramic filters in the fields of, for example, food and drug. Namely, ceramic films have been taking the place of porous organic films which have been employed in these fields, since ceramic films are superior to the organic ones in thermal resistance, pressure resistance, chemical resistance and separative power.

Moreover, porous ceramic films have been used as catalyst supports, bioreactors and supports for microbial incubation. In these cases, it is known that the efficiency of a catalytic reaction or the efficiency of microbial incubation is elevated with an increase in the specific surface area (i.e., surface area per unit weight) of a porous ceramic film.

In order to use a porous ceramic film as the filter or catalyst support described above, it is important for the film to have such a high porosity as to suffer from little pressure loss during filtration and a regulated pore size. When used as a bioreactor, etc., a porous ceramic film is required to have a large specific surface area in addition to the abovementioned requirements.

Furthermore, the permeability, which is the most important factor of a filter, is determined fundamentally depending on the pore size and the porosity, as shown in the Hagen-Poiseuille equation of the following equation 1. That is to say, permeation flow rate at filtration is increased, or the pressure loss is decreased, with an increase in the pore size and a decrease in the thickness.

$$dQ/dt = n\pi r^4 \Delta P/.8\eta l \qquad \text{[Equation 1]}$$

wherein n stands for the number of pores;
r stands for the radius of pore;
ΔP stands for the differential pressure;
η stands for the fluid viscosity; and
l stands for the thickness.

Meanwhile commercially available conventional porous ceramic filters are composed of a film part having a small pore size for practicing filtration and a base part having a large pore size for supporting the film. Such porous ceramic filters are produced by sintering powdery materials. Therefore, the pore size thereof can be regulated to a certain extent. For example, for such porous ceramic filters, there have been produced porous ceramic bodies having a fine pore size of 5 μm to 0.004 μm (Nihon Gaishi K. K.'s catalog) and, especially, ones having a pore size not greater than 1 μm have been extensively used. However, the maximum porosity of the film part is limited to at most about 40% by volume.

In the base part having a large pore size, the low porosity causes no pressure loss during filtration. In the film part having a small pore size, however, the low porosity results in a serious pressure loss. Moreover, the low porosity brings about another problem that the filtered matters can be hardly removed by loading back pressure thereonto, which deteriorates the regenerative characteristics of the filter.

In addition to the above-mentioned porous ceramic filters, porous glasses, etc., have been used as porous ceramic films for bioreactors (porous glass "VYCOR" mfd. by Corning Glass Works). However, these porous glasses have the problem of a low reaction efficiency because of the further lower porosity of from 20 to 30% by volume and the small specific surface area of about 200 m²/g. In addition, a porous glass, which can be hardly processed into a thin film, has a very poor permeability.

Accordingly, there arises an idea of producing a porous ceramic film with a high porosity by depositing ceramic fibers or whiskers in the form of a film onto a base. Although a high porosity can be achieved by this method, it is highly difficult to give a pore size of 0.1 μm or less thereby. This is because the pore size is determined substantially depending on the diameter of fibers or whiskers and it is very difficult to produce fibers or whiskers of a diameter of 0.1 μm or less (Cer. Mat. Compon. Engines (1986), pages 101–108)

In the case of fibers having a large aspect ratio (i.e., the ratio of length to diameter), in particular, the three-dimensionally intertwined structure of the fibers results in an extremely large pore size as compared with the case of whiskers. When the aspect ratio exceeds 200, for example, it is needed to regulate the fiber diameter to 0.01 μm or less in order to give a pore size of 0.1 μm. However, it is impossible to produce fibers having such a small diameter.

Although fibers or whiskers once formed may be mechanically shaped (Japanese Patent Laid-Open No. 3-150275), it is obviously impossible to finely and accurately control the pore size by mechanically pressing an aggregate of fine fibers or whiskers. It is also impossible to process these fibers or whiskers into a film. Accordingly, such a mechanical means is an altogether inappropriate process for producing filters, etc.

When fibers or whiskers are merely deposited in the form of a film onto a base, the three-dimensionally intertwined structure per se has only a weak binding force and a poor adhesiveness to the base. Thus it cannot be used as a filter, etc., because of the insufficient mechanical strength and pressure resistance. Thus Japanese Patent Publication No. 31174/1994 has proposed a method for achieving a large porosity and an improved pressure resistance by depositing whiskers onto pores inside a porous ceramic. However, this method fails to sufficiently improve the pressure resistance and, furthermore, cannot be applied to thin-film filters, although this idea can be applied to bulk porous bodies.

On the other hand, the specific surface area of a fiber or a whisker is determined substantially depending on the diameter and length thereof. Supposing that a fiber or a whisker is in the form of a column of R in radius and L in length, the specific surface area S of an aggregate of a density D is determined by the following equation 2.

$$S=2(R+L)/DRL \qquad \text{[Equation 2]}$$

Calculation in accordance with the above equation indicates that when the diameter of a fiber or a whisker is 0.1 μm, then the specific surface area is less than 15 m²/g, i.e., smaller than that of a porous glass. Accordingly, the high porosity of fibers or whiskers cannot be fully utilized merely by depositing the fibers or whiskers onto a base and thus the obtained film is unsuitable for a bioreactor.

SUMMARY OF THE INVENTION

Under these circumstances, the present invention aims at providing a porous ceramic film which has a high porosity, a good pressure resistance and a regulated pore size and is appropriate for a filter and a catalyst support, and a process for producing the same.

In order to achieve the above-mentioned object, the present invention provides a porous ceramic film which is formed onto and bonded to an oxide layer provided on the surface of a porous base, the film composed of finely deposited particles comprising at least one compound including (a) at least one selected from the group consisting of Si, B and Al or the group consisting of the metals of the Groups IVa, Va and VIa in the Periodic Table and b) at least one selected from the group consisting of C and N in which the particles are intertwined with each other and bonded to each other through the component of the oxide layer to form a three-dimensionally intertwined structure.

As the base on which the porous ceramic film is formed, a porous base is mainly used for an application of filters, but the base is not limited only to a porous one. Depending on the application, a non-porous material may also be used as the base. The oxide layer to be formed onto the base may be composed of a composition having a melting point not higher than the temperature of film formation and usually is composed mainly of a glass phase. The deposited particles may be in the form of fibers (including whiskers) or a plate-like or die-like shape, having a circular or hexagonal cross-section. These deposited particles are three-dimensionally intertwined with each other.

The process for producing the above-mentioned porous ceramic film comprises forming an oxide layer on the surface of a base to provide a coated base and heating the coated base to a temperature of not lower than the temperature at which the oxide layer turns to a liquid phase (i.e., not lower than the liquid-phase formation temperature of the oxide layer), in a gaseous atmosphere containing (a) at least one selected from the group consisting of Si, B and Al or the group consisting of the metals of the Groups IVa, Va and VIa in the Periodic Table and (b) at least one selected from the group consisting of C and N, whereby the above-mentioned porous ceramic film having a three-dimensionally intertwined structure is formed.

The present invention also provides structural composite materials having high strength and fracture toughness as well as filters and catalyst supports, using the aforestated porous ceramic film.

DETAILED DESCRIPTION OF THE PREFERRED EMBODIMENTS

Figure 1:
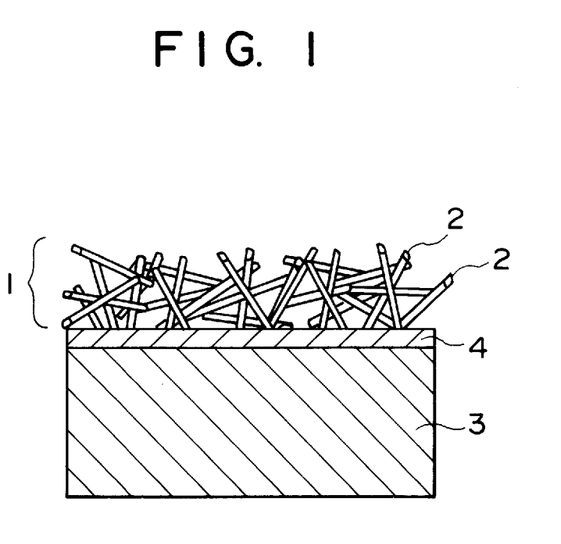
FIG. 1 is a model view for illustrating the porous ceramic film of the present invention formed on the surface of a porous base.

As shown in FIG. 1, for example, the porous ceramic film 1 of the present invention comprises a number of ceramic fibers or whiskers 2 entangled with each other which are firmly bonded to a base 3 via an oxide layer 4 located on the surface of the base 3. Thus, the porous ceramic film of the present invention is excellent in pressure resistance and abrasion resistance while sustaining the inherently high porosity of the film composed of fibers or whiskers deposited. Depending on the kind of the deposit and the processing conditions, the film may be constituted, besides the fibers or whiskers, of plate-like or die-like particles.

According to the preferred embodiment of the process of the present invention, the diameter or the length of the diagonal line of the cross section of the deposits constituting the porous ceramic film can be regulated to 0.1 μm or less, which cannot be achieved by the conventional deposition methods. Thus, the average pore size of the porous ceramic film can be regulated to 0.1 μm or less, while ensuring a high porosity of at least 40% by volume. In the present invention, the porosity can be increased up to 90%. This is another characteristic of the porous ceramic film of the present invention together with the above-mentioned characteristic in strength (pressure resistance, etc.). By regulating the diameter or the length of the diagonal line of the cross section of the deposited particles to 0.1 μm or less, it is also possible to control the specific surface area of the porous ceramic film to 15 m²/g or above. In the present invention, "diameter" or "length of diagonal line" is used to express the cross section size of the deposit in which a circular cross section is expressed by the diameter and a hexagonal cross section is expressed by the length of the diagonal line (hereinafter, referred to as "diagonal length").

In the case of forming a film from fibers or whiskers, the film formation is usually performed in the following manner. In the case of $Si_3N_4$, for example, gas phase species containing Si and N react with each other on a solid base to thereby form fine clusters of $Si_3N_4$ which develop into fibers or whiskers. The diameter of the fibers or whiskers is determined depending on the number of the clusters thus formed. Namely, the number of the fibers or whiskers is increased while the diameter thereof is reduced with an increase in the number of the clusters. In other words, it is important for the gas phase species to be consumed not for the development of the fibers or whiskers but for the formation of the clusters.

The present inventors have studied methods for promoting the formation of clusters in this case, and, as a result, found out that a number of clusters are formed in a liquid phase of a silicon-base oxide glass, thus completing the present invention. Thus it enables us to deposit fibers or whiskers with a small diameter, which cannot be achieved by the conventional techniques, and, in its turn, to give a porous ceramic film having a small average pore size. Besides the above porous film formation with fine fibers or whiskers, the process of the present invention can be applied, as a new coating process based on the VLS (vapor-liquid-solid) mechanism, to other various types of materials.

Also, the present invention makes it possible to deposit in other forms than fibers or whiskers.

As described above, the particles may be deposited as a compound or compounds, such as carbides, nitrides or carbon nitrides, containing at least one selected from the group consisting of Si, B and Al or at least one selected from the group consisting of the metals of the Groups IVa, Va and VIa in the Periodic Table by appropriately choosing the starting material source gas and/or an atmospheric gas. As described above, the form of the deposit may be changed depending on the starting material and the process conditions and it was found that besides the foregoing fibers or whiskers, the present method also provides plate-like or die-like particles.

Figure 4:
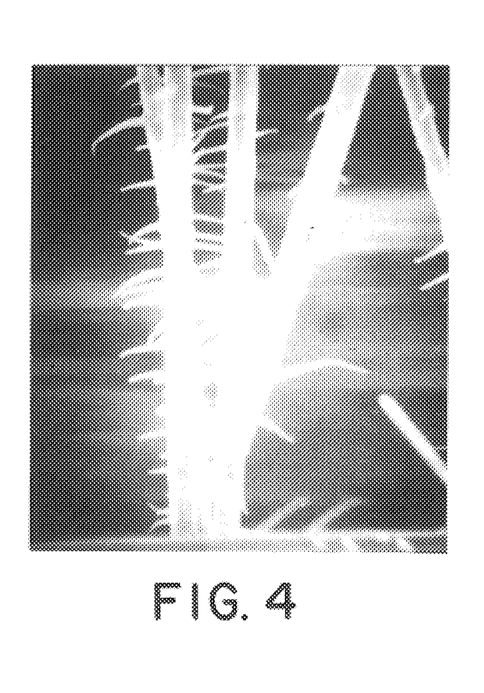
FIG. 4 is an electron microscopic photograph (10,000× magnification) showing the modified fibers composed of fine whiskers deposited on the surface of a fibrous base.

In this case, the base is usually made of a porous material in producing filters but it is not limited only to such a porous ceramic base for general applications. Further, the base may be in any desired form. For example, when using a base in the form of fibers, finer whiskers are deposited onto the surface of the fibrous base to produce a modified fibers, as shown in FIG. 4. Such dendritic whiskers are expected to find extensive use in special filters or catalysts depending on their form. By controlling the sizes of the base portion (i.e., trunk portion) and branch portion of the whiskers, it is possible to obtain a filter material having a finer pore size. In some case, by sintering in the aforestated oxygen-containing atmosphere after the film formation, bonding may be further formed at the joint portion between the branch portion and the trunk portion. Using such dendritic whiskers, special sensors can also be made owing to the flagellous function of branches. Further, when such fibers are used as a reinforcement for a composite ceramic material, they more firmly intertwine with each other to thereby enhance the fracture toughness of the composite ceramic material which is useful for the production of various structural parts in which high strength and fracture toughness are required.

The above-mentioned oxide layer, which is formed onto the base to provide a liquid phase, may be of any material which turns into a liquid phase at the deposition temperature, i.e., film formation temperature. The oxide layer may also be formed of oxynitride including nitrogen in oxide.

For instance, when an $Al_2O_3$—$CaO$ oxide layer is formed onto a dense $Al_2O_3$ base and heated to a temperature of 1400° C. in a gaseous atmosphere containing $AlCl_3$ and nitrogen under a pressure of 600 Torr, a porous film composed of AlN whiskers can be formed. The resultant film effectively acts in heat release from the base because of the high thermal conductivity of AlN and the high specific area of the whiskers.

As an alternative example, when an $SiO_2$—$Al_2O_3$ oxide layer is formed onto a porous SiC base and heated to a temperature of 1700° C. in a gaseous atmosphere containing $BCl_3$ and $CH_4$ under a pressure of 600 Torr, a porous film composed of plate-like $B_4C$ is formed. In either case, when a fiber-like base is used, a dendritic film is formed as described above.

In the process of the present invention, a thin oxide layer is first formed on the surface of a base. Although the oxide layer may be formed by any method including CVD method and sputtering without restriction, it is preferable to employ the sol-gel method with the use of a solution of, for example, a metal alkoxide, since a coating film with an elevated uniformity can be obtained and thus fibers or whiskers can be uniformly formed thereby. The sol-gel method comprises applying a precursor solution prepared from a metal alkoxide onto the surface of the base and then firing it in the air at a temperature of 200° C. or above. When the firing temperature is lower than 200° C., moisture and alcohol remaining in the oxide layer cause the deterioration of the strength of the oxide layer. Although the firing may be effected at a high temperature, it is disadvantageous from an economical viewpoint. Preferably, the firing temperature is not higher than 1000° C.

Next, the base, on which a thin oxide layer has been formed as described above, is heated to a temperature not lower than the temperature at which the oxide layer turns into a liquid phase, in a gaseous atmosphere containing (a) at least one selected from the group consisting of Si, B and Al or the group consisting of the metals of the Groups IVa, Va and VIa and (b) at least one selected from C and N, under a pressure of 10 Torr or above. By this heating, clusters are formed in the liquid phase of the oxide layer. These clusters develop into a number of fine fibers (including whiskers), or plate-like or die-like particles whose cross-section is in a circular or hexagonal shape.

Although the diameter or the diagonal length of the deposited particles varies depending on the heating temperature, pressure, the viscosity of the oxide layer, etc., the diameter in the case of a circular cross section is theoretically determined in accordance with the Stokes-Einstein equation of the following equation 3.

$$D = kT/6\pi r \eta \qquad \text{[Equation 3]}$$

wherein

D stands for the diffusion coefficient of the molten liquid;

T stands for the temperature;

r stands for the diameter of diffusing particles;

η stands for the viscosity coefficient of the molten liquid; and k is a constant.

As described above, the cross-sectional size expressed by the diameter or the diagonal length of the deposits each in the form of fiber or whisker or a plate-like or die-like form is determined depending on the number of the clusters formed. Namely, the cross-sectional size of the deposit decreases with an increase in the number of the clusters. At a smaller diffusion coefficient of the gas phase species in the molten liquid, the larger amount of the gas phase species is consumed not for the growth of the whiskers but for the formation of the clusters, thus decreasing the cross-sectional size of the deposit. Namely, the above equation 3 suggests that in order to deposit particles of a small cross-section and a fine pore size, it is necessary that the temperature T be low and the molten liquid have a high viscosity. As the result of the examination by the present inventors, it has been proved that temperature is the most important factor among all.

In order to give a fine pore size, therefore, a lower liquid-phase formation temperature (i.e., a lower melting point of the oxide layer) is the more desirable. The liquid-phase formation temperature depends on the composition of the oxide layer. For example, even in case where the oxide exclusively comprises Si and O, fibers or whiskers deposited with a sufficiently small size as compared with a case provided with no liquid phase. This suggests that the effects of the present invention have been established therein. However, the diameter of the fibers or whiskers falls within a relatively large range due to the high melting point (1,700°

C.) of the oxide layer. In order to reduce the melting point of the oxide layer, it is desirable to add a small amount of additives which are capable of forming a liquid phase with the main component of the oxide layer at a lower melting point. However, it is essential that the additives accelerate entanglement of deposited particles and adherence onto the oxide layer without inhibiting the deposition of particles or deteriorating the mechanical properties inherent to the deposit.

For example, when either Al or Y is added to a silicon-base oxide layer, the melting point of the silicon-base oxide glass layer is largely lowered and thus the diameter of the deposit, such as fibers or whiskers, can be remarkably reduced. Thus a porous ceramic film of a smaller pore size can be obtained. To obtain a smaller pore size, it is furthermore effective to add at least one of the elements of the Groups Ia and IIa in the Periodic Table to the silicon-base oxide layer, since the temperature of the appearance of the liquid phase is further lowered thereby.

Further, when the oxide layer is an aluminum-base oxide layer, it is preferable to add at least one selected from among alkaline earth elements, rare earth elements or silicon-base oxides. The composition and pressure of a gas supplied when heating and the method for supplying the gas are properly selected, depending on the composition of the porous ceramic film to be formed. For example, in case where an Si—O base oxide layer is formed onto a base and a porous ceramic film consisting mainly of silicon nitride fibers or whiskers is formed in an intertwined structure, an Si—N gas is supplied.

The Si—N gas may be supplied by either the vapor phase transportation of a compound containing Si and N or the evaporation of an $Si_3N_4$ powder. It is particularly preferable to use an amorphous powder of $Si_3N_4$ therefor, since it can be evaporated in a large amount. Further, addition a compound or compounds of the elements of the Group IVa, especially $TiO_2$, is very desirable since the evaporation is activated and accelerated. When fibers are directly formed on a base, an amorphous powder of $Si_3N_4$ is generally evaporated only in a limited amount and thus no fibers or whiskers are formed, unless it is heated to 1,400° C. or above under a pressure of 300 Torr or above. In the process of the present invention wherein a silicon-base oxide glass layer is provided on the surface of the base, however, fibers or whiskers can be formed even though $Si_3N_4$ is evaporated only in a limited amount. This is seemingly because nuclei are easily formed in the liquid phase.

When an Al—O based oxide layer is provided on a base and a porous ceramic film consisting mainly of fiber-like deposits of aluminum nitride is formed onto the oxide layer, an Al—N gas is supplied. In this case, the Al—N gas may be supplied by either the vapor phase transportation of a compound containing Al and N or the evaporation of an AlN powder by heating.

When a porous ceramic film composed mainly of aluminum oxide is deposited on the same oxide layer, an Al—O gas is supplied in the same manner as described for the foregoing film formation of silicon nitride or aluminum nitride.

Similarly to the film formation of silicon nitride, it is particularly preferable to use an amorphous powder of aluminum nitride or aluminum oxide as the source material for the gas.

When an Si—O base oxide layer is provided on a base and a porous ceramic film consisting mainly of fiber-like deposits of titanium nitride or titanium carbide is formed onto the oxide layer, a Ti—N or Ti—C gas is supplied in the same fashion as described for the foregoing film formation of silicon nitride, aluminum nitride and aluminum oxide. Similar procedures are applied to other film-forming elements, such as the elements of the group Va elements (e.g., V, Nb or Ta), the group VIa elements (e.g., Cr, Mo, or W) and boron. The form of the deposits is not limited only to fibers (including whiskers). The deposited particles may be in a plate-like or die-like shape having a circular cross-section of a small diameter or a hexagonal cross-section of a small diagonal length, depending on the kind of the oxide layer provided on the base, the composition of a supplied source gas, the processing condition such as heating condition.

A smaller cross section of the deposit can be obtained at a lower treating temperature. However, no deposit is formed at a temperature lower than 1,000° C. On the other hand, a temperature exceeding 1,800° C. is generally economically disadvantageous and, furthermore, excessively increases the cross sectional size of the deposit. Therefore, the treating temperature should range from 1,000° to 1,800° C. A deposit having a smaller cross sectional size can be obtained with decrease in the pressure of the supplied gas phase. However, no deposit is formed under a pressure lower than 10 Torr. Although the pressure of the supplied gas phase may be high, an excessively high pressure tends to increase the cross section of the deposited particles or the length along the longitudinal direction of the deposited particles, which is disadvantageous from an economical viewpoint.

So far as the inventors confirmed, for example when an amorphous $Si_3N_4$ powder was employed as an evaporative source for the formation of the foregoing porous ceramic film of silicon nitride, no porous ceramic film of $Si_3N_4$ fibers was formed, unless the source material was heated to a temperature of 1400° C. or higher under a pressure of 300 Torr or higher, since evaporation of the amorphous $Si_3N_4$ powder was slight at a temperature lower than 1400° C. and a pressure lower than 300 Torr. However, such a problem arises when a base was not coated with the oxide layer. The inventors found that when the oxide layer was provided to a base prior to the film formation according to the present invention, whiskers deposited even with a small evaporation. The reason for this is believed to be that nuclei are easily formed in the liquid phase. The length of the whiskers tends to become short when the pressure during the film formation is low.

The lower limit of the diameter or diagonal length of the cross-section of the deposits formed by the process of the present invention or the average pore size is 0.001 $\mu$m. To confirm a size smaller than this level, it is necessary to use, for example, an atomic microscope of ultrahigh resolution, which is inconsistent with reality. Therefore, the upper limit of the specific surface area of the porous ceramic film which can be achieved in the present invention in accordance with the above-mentioned equation 2 is about 1,250 $m^2/g$.

When the deposit constituting the porous ceramic film of the present invention is fibers or whiskers, the aspect ratio of the fibers or whiskers ranges from 5 to 200. When the aspect ratio is smaller than 5, the porosity is lowered and the pressure loss during the filtration is increased. When the aspect ratio exceeds 200, on the other hand, the adhesion strength among the fibers or whiskers is reduced and, as a result, the fibers or whiskers are liable to peel off the base due to the differential pressure during the filtration. Further, it is impossible to deposit a porous ceramic film having an average pore size of 1 $\mu$m or less.

Figure 3:
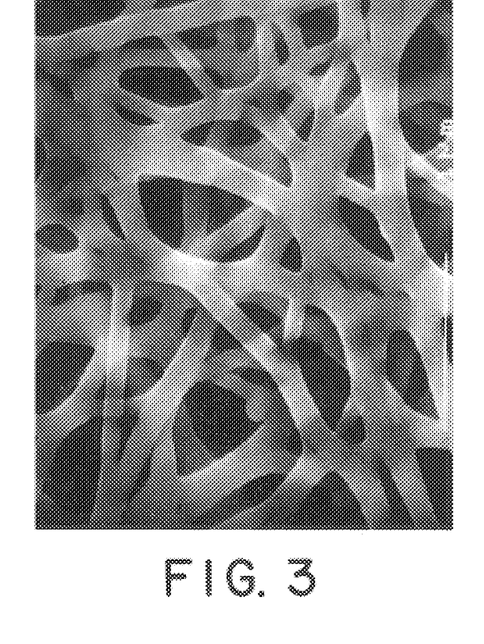
FIG. 3 is an electron microscopic photograph (30,000× magnification) showing the network structure of the porous ceramic film of the present invention.

Further, it was found that when the porous ceramic film was subjected to heat treating in the air or an inert gas including oxygen, sintering was further progressed among particles deposited on the oxide layer so that a porous ceramic film having a three-dimensional network structure, as shown in FIG. 3, was formed. Since the surface of each particles deposited on the oxide layer is coated with the oxide layer, the particles will grow by heat-treating at a high temperature. However, the particles cannot form the desired network structure merely by heat treating. For the formation of the network structure, the presence of oxygen in the atmospheric gas is essential because oxygen activates mass transfer at interfaces portions between the particles and permits the formation of a strong network structure.

The heating temperature for the foregoing sintering among the particles should be 900° C. or above. Although a higher heating temperature promotes the sintering, it leads to an increase in the size of the resultant pores. Therefore, the heating temperature is preferably in the temperature range of from 900° to 1300° C. When the heating temperature is below 900° C., no sintering occurs even if the diameter or diagonal length of the particles are increased. On the other, a heating temperature exceeding 1300° C. results in a large pore size greater than 1 μm. In order to effectively proceed the sintering among the deposited particles, the heating atmosphere should include oxygen. As such an atmosphere, there may be mentioned air or an inert gas (e.g., nitrogen or argon) including oxygen.

When a three-dimensional structure is formed due to the sintering among the particles, the pore size of the resultant porous ceramic film increases to 0.1 μm to 1 μm, although the porosity is unchanged as compared with that before the heat treatment. The resultant three-dimensional network structure has a further increased pressure resistance.

To ensure the full utilization of the performance of the porous ceramic film of the present invention as a filter or a catalyst support, the film thickness is preferably at least 10 times as large as the average pore size. When the thickness is smaller than this value, a wide pore size distribution is liable to occur and thus, collection efficiency in the filtration will be reduced in the part with a large pore size. On the other hand, a film thickness 100 times or more as large as the average pore size is not preferable, since the filtration performance tends to deteriorate. Preferably, the film thickness is 10 to 20 times as large as the average pore size.

Because the porous ceramic film of the present invention is composed of an agglomeration of fine particles with a small diameter or diagonal length in a three-dimensionally entangled state, a porous ceramic film having a high porosity of 40% by volume or above can be obtained. Especially, when the deposit has a small diameter or diagonal length in its cross section, a porosity of from 70 to 90% by volume can be obtained.

Since the porous ceramic film of the present invention has a three dimensionally intertwined structure constituted of fine fibers, whiskers, etc., it has a high porosity and an excellent permeability. Also, since the individual whiskers or fibers are firmly bonded to each other via the glass phase, which is present on the surface of the whiskers or fibers, and, at the same time, they are firmly adhered to the base, the porous ceramic film constituted thereof has a high abrasion resistance and a good pressure resistance. Further, the porous ceramic film can exhibit an extremely superior filtration performance with a pore size of 1 μm or smaller. This is very advantageous in the use as a filter, considering that there is a most strong demand for filters having a pore size not greater than 1 μm. Especially, since the pore size of the inventive porous ceramic film can be reduced to 0.001 μm, the film can be formed into a new filter which can provide a good utility in applications in which the filter pore size should be in the range of from 0.001 μm to 0.1 μm. In such applications, besides organic films, only a porous glass filter have been used up to now.

Further, the porous ceramic film of the present invention is also desirable as a catalyst support or a bioreactor because of its high porosity and large specific surface area.

EXAMPLE 1

Porous $Si_3N_4$ (porosity: 50% by volume, average pore size: 0.5 μm) was cut into pieces of 25 mm in diameter and 1 mm in thickness to give porous bases. A liquid of a mixture consisting of a $SiO_2$ powder, an $Al_2O_3$ powder and a $Y_2O_3$ powder at a weight ratio of 2:1:1 dispersed in ethanol was applied onto one face of each base, and dried at room temperature for 1 minute. The base was fired in the air at 500° C. for 1 hour to form a silicon-base oxide glass layer (thickness: 15 μm) on the surface thereof.

The base sample, on which the glass layer had been formed, was set in a CVD (chemical vapor deposition) furnace and maintained at a temperature of 1,400° to 1,800° C. under a pressure of 500 Torr for a period of time as specified in Table 1 while supplying a $SiCl_4$ gas and an $N_2$ gas each at a flow rate as specified in Table 1. After cooling, it was taken out of the furnace. Thus a porous ceramic film was formed by the deposition of fibers or whiskers on the surface of the glass layer of each of the samples 1 to 8.

Figure 2:
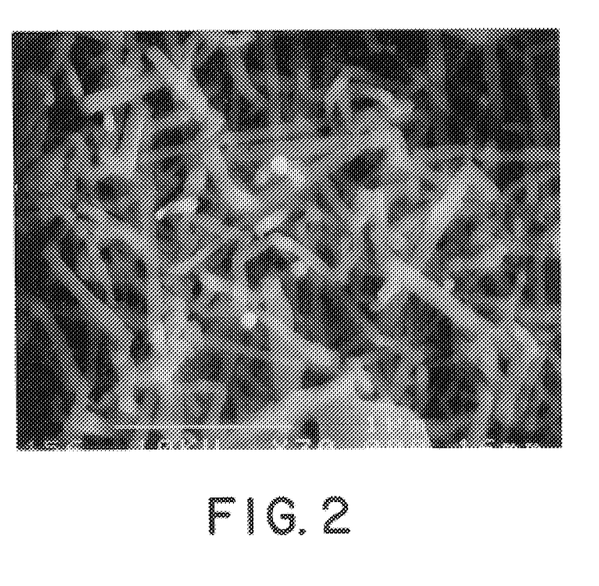
FIG. 2 is an electron microscopic photograph (30,000× magnification) showing the form of fibers or whiskers constituting the porous ceramic film of the present invention.

The pore size distribution of each of the samples 1 to 8 was measured before and after the formation of the porous ceramic film by using an argon gas adsorption pore size distribution meter and the average pore size of the porous ceramic film (filtering part) was determined depending on the difference between these data. Also, the thickness of each porous ceramic film and the form of whiskers or fibers constituting the porous ceramic film were determined via observation under a high resolution scanning electron microscope (SEM) or a transmission electron microscope (TEM). FIG. 2 shows an electron microscopic photograph of the form or structure of whiskers constituting a typical porous ceramic film.

For comparison, commercially available $Al_2O_3$ filters (overall thickness: 1 mm, film thickness of the filtering part: 30 μm, average pore size of the filtering part: 0.004 μm, 0.01 μm and 0.1 μm) were cut into pieces of 25 mm in diameter to give samples 9 to 11.

The permeation flow rate of air (differential pressure: 1 kg/cm$^2$) through each of the samples 1 to 11 was measured by using a permeation flow rate meter (ASTM F-316). Regarding the samples of an average pore size of the filtering part of 0.004 μm, a liquid containing particles of 0.01 μm in diameter dispersed in water was allowed to permeate therethrough. The absorbance of the liquid was measured before and after the permeation and thus the efficiency of collecting the particles was calculated. Table 1 summarizes the results. It can be understood from the test data that the samples of the present invention are each excellent in permeability and collection efficiency.

TABLE 1

| Sample No. | Temp. (°C.) | Flow rate (ml/min) SiCl₄ | Flow rate (ml/min) N₂ | Time (hr) | Average pore size of filtering part ($\mu$m) | Film thickness of filtering part ($\mu$m) | Ratio of film thickness/pore size | Permeation flow rate (ml/min · cm²) | Collection efficiency (%) |
|---|---|---|---|---|---|---|---|---|---|
| 1 | 1400 | 100 | 75 | 0.2 | 0.004 | 0.05 | 12.5 | 130 | 100 |
| 2 | 1400 | 100 | 75 | 0.4 | 0.004 | 0.076 | 19 | 118 | 100 |
| 3 | 1400 | 100 | 75 | 0.4 | 0.004 | 0.10 | 25 | 102 | 100 |
| 4 | 1400 | 100 | 75 | 1.0 | 0.004 | 0.30 | 75 | 69 | 100 |
| 5 | 1400 | 100 | 75 | 1.5 | 0.004 | 0.48 | 120 | 14 | 100 |
| 6 | 1600 | 150 | 90 | 0.2 | 0.012 | 0.13 | 10.8 | 305 | — |
| 7 | 1600 | 150 | 90 | 2.0 | 0.013 | 1.08 | 83 | 28 | — |
| 8 | 1800 | 355 | 95 | 0.8 | 0.100 | 1.60 | 16 | 377 | — |
| 9 |  |  |  |  | 0.004 | 30 | 7500 | 0.25 | — |
| 10 |  |  |  |  | 0.010 | 30 | 3000 | 1.42 | — |
| 11 |  |  |  |  | 0.100 | 30 | 300 | 19.2 | — |

Note:
Sample Nos. 1–8: Samples of the present invention
Sample Nos. 9–11: Comparative samples

EXAMPLE 2

Porous $Al_2O_3$ (porosity: 50% by volume, average pore size: 0.5 $\mu$m) was cut into pieces of 25 mm in diameter and 1 mm in thickness to give porous bases On one face of each base was formed an oxide layer (thickness: 0.2 $\mu$m) comprising $SiO_2$, $Al_2O_3$, $Y_2O_3$ and MgO (weight ratio: 3:3:5:1) by the sputtering method.

These base samples 1 were each set in a CVD furnace and maintained at a temperature of 1,300° to 1,400° C. under a pressure of 5 to 510 Torr, each as specified in Table 2, for five hours together with a powder mixture consisting of an amorphous $Si_3N_4$ powder and $TiO_2$ in an amount of 5 wt.% based on the weight of the amorphous $Si_3N_4$ powder. Then it was cooled and taken out.

The average pore size and the form of deposited whiskers or fibers of each porous ceramic film were examined in the same manner as described in Example 1. The aspect ratio of the deposited product was determined with an SEM.

Further, air (pressure: 10 kg/cm²) was blown onto each sample to examine whether the film peeled off or not. Regarding the samples showing no peeling after blowing air, the permeation flow rates were determined by the same method as the one described in Example 1.

For comparison, the same base samples as described above were treated for the formation of a porous ceramic film in the same way as described above, without forming no oxide layer. The resultant films were examined for the average pore size, the film thickness and the form of the deposited whiskers or fibers.

The test results are shown in Tables 2 and 3.

TABLE 2

| Sample No. | Temp. (°C.) | Presence of oxide layer | Pressure (Torr) | Form of fiber/whisker Diameter ($\mu$m) | Form of fiber/whisker Length ($\mu$m) | Form of fiber/whisker Aspect ratio | Average pore size of filtering part ($\mu$m) | Occurrence of peeling |
|---|---|---|---|---|---|---|---|---|
| 1 | 1300 | yes | 500 | 0.005 | 0.8 | 160 | 0.010 | no |
| 2 | 1400 | yes | 500 | 0.010 | 2.0 | 200 | 0.030 | no |
| 3 | 1300 | yes | 100 | 0.001 | 0.010 | 10 | 0.002 | no |
| 4 | 1400 | no | 500 | 0.2 | 650 | 3250 | 2.1 | yes |
| 5 | 1400 | no | 500 | 0.6 | 540 | 900 | 5.5 | yes |
| 6 | 1400 | yes | 510 | 0.010 | 2.1 | 210 | 0.090 | yes |
| 7 | 1300 | yes | 25 | 0.005 | 0.02 | 4 | 0.010 | no |
| 8 | 1400 | yes | 25 | 0.010 | 0.04 | 4 | 0.030 | no |
| 9 | 1300 | yes | 10 | 0.001 | 0.004 | 4 | 0.002 | no |
| 10 | 1300 | yes | 5 | — | — | — | — | — |

Note:
Sample Nos. 1–3: Samples of the present invention
Sample Nos. 4–10: Comparative samples

TABLE 3

| Sample | Temp. (°C.) | Form of fiber/whisker ||| Average pore size of filtering part (µm) | Film thickness of filtering part (µm) | Ratio of Film thickness/ pore size | Permeation flow rate (ml/min · cm²) |
|---|---|---|---|---|---|---|---|---|
| | | Diameter (µm) | Length (µm) | Aspect ratio | | | | |
| 1 | 1300 | 0.005 | 0.8   | 160 | 0.010 | 0.15  | 15 | 27 |
| 2 | 1400 | 0.010 | 2.0   | 200 | 0.030 | 0.45  | 14 | 26 |
| 3 | 1300 | 0.001 | 0.010 | 10  | 0.002 | 0.030 | 15 | 28 |
| 7 | 1300 | 0.005 | 0.02  | 4   | 0.010 | 0.15  | 15 | 10 |
| 8 | 1400 | 0.010 | 0.04  | 4   | 0.030 | 0.45  | 15 | 9  |
| 9 | 1300 | 0.001 | 0.004 | 4   | 0.002 | 0.026 | 13 | 12 |

Note
Sample Nos. 1–3: Samples of the present invention
Sample Nos. 7–9: Comparative samples The inventive samples were not subjected to peeling and showed superior permeability.

EXAMPLE 3

Porous $Al_2O_3$ (porosity: 50% by volume, average pore size: 0.5 µm) was cut into pieces of 25 mm in diameter and 1 mm in thickness to give porous bases. A 10% solution of a mixture comprising $Si(OC_2H_5)_4$, $Al(OC_3H_7)_3$ and $Ca(OC_3H_7)_2$ (Si:Al:Ca=1:1:1) in methanol was applied onto one face of each base by the sol-gel method and then fired in the air at 200° C. for five hours to form an oxide layer thereon. In case where the porous $Al_2O_3$ base was heated at 170° C. in place of the above heating at 200° C. for five hours, partial peeling occurred in an oxide layer formed onto the base by the subsequent heating at 1200°–1800° C.

These samples were each set in a heating oven and maintained at a temperature of 1,200° to 1,800° C. under a pressure of 1 to 500 atm for five hours together with an amorphous powder of $Si_3N_4$. Then it was cooled and taken out. The aspect ratio of the deposited whiskers was observed for each sample in the same way as described in Example 1, and the specific surface area and average pore size were measured. Further, the permeation flow rate of air was determined under a pressure of 2.5 kg/mm in a similar manner to Example 1. For comparison, a porous glass (porosity: 28% by volume, VYCOR 7930 mfd. by Corning Glass Works) was processed into a thickness of 10 µm by laser and was examined similarly to the above samples.

Test results are shown in Table 4.

Each of the samples of the present invention has a large specific surface area and a good permeability. The porous ceramic film of the sample 7 peeled off in the permeation test.

TABLE 4

| Sample No. | Temp. (°C.) | Pressure (atm) | Form of fiber/whisker ||| Av. pore size of filtering part (µm) | Film thickness of filtering part (µm) | Specific surface area (m²/g) | Permeation flow rate (ml/min · cm²) |
|---|---|---|---|---|---|---|---|---|---|
| | | | Diameter (µm) | Length (µm) | Aspect ratio | | | | |
| 1  | 1200 | 1   | 0.001 | 0.012 | 12  | 0.002 | 0.1  | 1250 | 29      |
| 2  | 1300 | 1   | 0.010 | 0.130 | 13  | 0.030 | 0.5  | 135  | 87      |
| 3  | 1600 | 1   | 0.020 | 0.300 | 15  | 0.071 | 0.9  | 65   | 88      |
| 4  | 1800 | 1   | 0.031 | 0.744 | 24  | 0.099 | 1.6  | 42   | 91      |
| 5* | —    | —   | —     | —     | —   | 0.004 | 10   | 250  | 0.2     |
| 6  | 1800 | 1   | 0.095 | 0.855 | 9   | 0.253 | 1.6  | 14   | 177     |
| 7  | 1800 | 500 | 0.099 | 11.88 | 120 | 0.884 | 1.9  | 10   | peeling |

Note:
Sample Nos. 1–4: Samples of the present invention
Sample Nos. 5–7: Comparative samples
*Porous glass

EXAMPLE 4

Porous $Al_2O_3$ (porosity: 50% by volume, average pore size: 0.5 µm) was cut into pieces of 25 mm in diameter and 1 mm in thickness to give porous bases. A 10% solution of a mixture comprising $Si(OC_2H_5)_4$, $Al(OC_3H_7)_3$ and $Na(OC_3H_7)_2$ (Si:Al:Na=2:2:1) in methanol was applied onto one face of each base by the sol-gel method and fired in the air at 200° C. for five hours to form an oxide layer thereon.

These samples were each set in a heating oven at a temperature of 900°, 1,000° or 1,800° C. under a pressure of 1 atm for five hours together with an amorphous powder of $Si_3N_4$. Then it was cooled and taken out. The aspect ratio of the deposited whiskers or fibers was observed for each sample and the average pore size was measured, in the same way as described in Example 1. A liquid containing particles of 1 µm in diameter dispersed in water was allowed to permeate through each of the samples and the absorbance of the liquid was measured before and after the permeation so that the efficiency of collecting the particles was calculated.

Comparative samples were prepared by forming a porous ceramic film at 1,000° C. or 1,800° C. at 1,000 atm in an HIP furnace and evaluated as described above.

Table 5 summarizes the results.

The samples of the present invention could collect all the particles of 1 μm, i.e., showed a collection efficiency of 100%.

TABLE 5

| Sample No. | Temp. (°C.) | Pressure (atm) | Form of fiber/whisker | | | Average pore size of filtering part (μm) | Film thickness of filtering part (μm) | Collection efficiency (%) |
|---|---|---|---|---|---|---|---|---|
| | | | Diameter (um) | Length (μm) | Aspect ratio | | | |
| 1 | 1000 | 1 | 0.001 | 0.013 | 13 | 0.002 | 0.1 | 100 |
| 2 | 1800 | 1 | 2.5 | 25 | 10 | 0.990 | 49.5 | 100 |
| 3 | 900 | 1 | no whisker or fiber deposited. | | | | | |
| 4 | 1000 | 1000 | 0.09 | 108 | 1200 | 1.23 | 7.6 | 25 |
| 5 | 1800 | 1000 | 3.4 | 5576 | 1640 | 10.3 | 7.5 | 4 |

Note:
Sample Nos. 1–2: Samples of the present invention
Sample Nos. 3–5: Comparative samples

EXAMPLE 5

The samples of the present invention prepared in Example 4 were used in the following procedure.

Each sample was heated at a temperature of 800° to 1,400° C. for a period of 1 to 10 hours in the air and the permeation flow rate was measured in the same way as described in Example 1. Further, air (pressure: 20 kg/cm$^2$) was blown onto each sample to examine whether the film peeled off or not.

Table 6 shows the results.

TABLE 6

| Sample No. | Film thickness of filtering part (μm) | Heating conditions | | Form of film after heating | Average pore size after filtering part (μm) | Occurrence of peeling | Permeation flow rate (ml/min · cm$^2$) |
|---|---|---|---|---|---|---|---|
| | | Temp. (°C.) | Time (Hr) | | | | |
| 1 | 0.1 | not heated | | whisker | 0.002 | yes | 29 |
| 1-0 | 0.1 | 800 | 10 | whisker | 0.074 | yes | 89 |
| 1-1 | 0.1 | 800 | 3 | whisker | 0.066 | yes | 77 |
| 1-2 | 0.1 | 900 | 3 | network | 0.101 | no | 92 |
| 1-3 | 0.1 | 1100 | 3 | network | 0.699 | no | 88 |
| 1-4 | 0.1 | 1300 | 3 | network | 0.999 | no | 90 |
| 1-5 | 0.1 | 1350 | 3 | network | 1.999 | no | 166 |
| 3 | 0.9 | not heated | | whisker | 0.071 | yes | 88 |
| 3-0 | 0.9 | 850 | 1 | whisker | 0.100 | yes | 89 |
| 3-1 | 0.9 | 900 | 1 | network | 0.133 | no | 102 |
| 3-2 | 0.9 | 1200 | 1 | network | 0.455 | no | 66 |
| 3-4 | 0.9 | 1300 | 1 | network | 0.899 | no | 86 |
| 3-5 | 0.9 | 1350 | 1 | network | 1.333 | no | 97 |

Note:
Sample Nos. 1, 1-0, 1-1, 1-2, 1-3, 1-4, 3, 3-0, 3-1, 3-2 and 3-4: Samples of the present invention
Sample Nos. 1–5 and 3–5: Comparative samples It can be understood that the heated samples having a network structure have a higher resistance to pressure than samples constituted of whiskers.

EXAMPLE 6

Dense Al$_2$O$_3$ (porosity: 0%) was cut into pieces of 25 mm in diameter and 1 mm in thickness to give bases. A liquid of a mixture consisting of Al$_2$O$_3$ powder and CaO at a weight ratio of 2:1 dispersed in ethanol was applied onto one face of each base. After drying the coated base at room temperature for 1 minute and firing in the air at 500° C. for 1 hour to form an oxide layer on the surface of the base.

The base sample was set in a CVD furnace and maintained at a temperature of 1,400° to 1,700° C. under a pressure of 700 Torr for one hour while supplying an AlCl$_3$ gas and a N$_2$ gas both at a flow rate of 0.1 liter/min. After cooling, it was taken out of the furnace.

The pore size distribution of each of the thus obtained samples was measured by using a nitrogen gas adsorption pore size distribution meter. Also, the form of the porous ceramic film was observed under a high resolution scanning electron microscope (SEM) and the deposit was identified by means of X-ray diffraction.

Comparative samples were prepared by performing the CVD method as described above without forming any oxide layer.

Table 7 summarizes the results.

In case where an oxide layer was not formed onto the base, no whisker was deposited on the base. In contrast to this, fine AlN whiskers were deposited in the inventive samples.

TABLE 7

| Sample No. | Presence of oxide layer | Temperature (°C.) | Form of Deposit | Average pore size of filtering part (μm) |
|---|---|---|---|---|
| 1 | yes | 1400 | whisker | 0.022 |
| 2 | yes | 1500 | whisker | 0.035 |
| 3 | yes | 1600 | whisker | 0.099 |
| 4 | yes | 1700 | whisker | 0.102 |
| 5 | no | 1400 | no | — |
| 6 | no | 1500 | no | — |
| 7 | no | 1600 | no | — |
| 8 | no | 1700 | no | — |

Note:
Sample Nos. 1–4: Samples of the present invention.
Sample Nos. 5–8: Comparative samples

EXAMPLE 7

Porous SiC (porosity: 30% by volume) was cut into pieces of 25 mm in diameter and 1 mm in thickness to give porous bases and various kinds of oxide layers were formed onto one face of the respective bases by the sol-gel method.

These samples were each set in a CVD furnace and maintained at a temperature of 1,700° C. under a pressure of 600 Torr for one hour while supplying a gas produced by the reaction of various combination of metal pieces (or metal source gases) and gases under the following conditions. After cooling, they were was taken out of the furnace.

(1) no metal piece, $TiCl_4$: 0.2 liter/min, $CH_4$: 0.2 liter/min, $H_2$: 1.2 liter/min
(2) no metal piece, $ZrCl_4$: 0.2 liter/min, $CH_4$: 0.2 liter/min, $H_2$: 1.2 liter/min
(3) no metal piece, $SiCl_4$: 0.2 liter/min, $CH_4$: 0.2 liter/min, $H_2$: 1.2 liter/min
(4) no metal piece, $BCl_3$: 0.3 liter/min, $CH_4$: 0.2 liter/min, $H_2$: 1.0 liter/min
(5) Metal: Cr, HCl: 0.2 liter/min, $CH_4$: 0.2 liter/min, $H_2$: 1.2 liter/min
(6) Metal: Mo, HCl: 0.2 liter/min, $CH_4$: 0.2 liter/min, $H_2$: 1.2 liter/min
(7) Metal: V, HCl: 0.2 liter/min, $CH_4$: 0.2 liter/min, $H_2$: 1.2 liter/min
(8) Metal: Ta, HCl: 0.2 liter/min, $CH_4$: 0.2 liter/min, $H_2$: 1.2 liter/min
(9) Metal: Nb, HCl: 0.2 liter/min, $CH_4$: 0.2 liter/min, $H_2$: 1.2 liter/min
(10) no metal piece, $TiCl_4$: 0.2 liter/min, $N_2$: 0.2 liter/min, $H_2$: 1.2 liter/min
(11) no metal piece, $ZrCl_4$: 0.2 liter/min, $N_2$: 0.2 liter/min, $H_2$: 1.2 liter/min
(12) no metal piece, $SiCl_4$: 0.2 liter/min, $N_2$: 0.2 liter/min, $H_2$: 1.2 liter/min
(13) no metal piece, $BCl_3$: 0.3 liter/min, $N_2$: 0.2 liter/min, $H_2$: 1.0 liter/min
(14) Metal: Cr, HCl: 0.2 liter/min, $N_2$: 0.2 liter/min, $H_2$: 1.2 liter/min
(15) Metal: Mo, HCl: 0.2 liter/min, $N_2$: 0.3 liter/min, $H_2$: 1.2 liter/min
(16) Metal: V, HCl: 0.2 liter/min, $N_2$: 0.3 liter/min, $H_2$: 1.2 liter/min
(17) Metal: Ta, HCl: 0.2 liter/min, $N_2$: 0.3 liter/min, $H_2$: 1.2 liter/min
(18) Metal: Nb, HCl: 0.2 liter/min, $N_2$: 0.3 liter/min, $H_2$: 1.2 liter/min
(19) $AlCl_3$: 0.2 liter/min, $N_2$: 0.2 liter/min $H_2$: 1.2 liter/min The pore size distribution of each of the thus obtained samples was measured by using a nitrogen gas adsorption pore size distribution meter. Also, the form of the porous ceramic film was observed under a high resolution scanning electron microscope (SEM).

Comparative samples were prepared by performing the CVD method as described above without forming any oxide layer.

Table 8 summarizes the results.

In case where an oxide layer was not formed onto the base, no deposit was detected. In contrast to this, fine deposit was obtained in various forms in the inventive samples.

TABLE 8

| Sample No. | Presence of oxide layer | Kind of oxide layer (system) | Species of gas | Form of deposit | Main deposited phase | Average pore size of filtering part (μm) |
|---|---|---|---|---|---|---|
| 1 | yes | $Al_2O_3$—CaO | (19) | whisker | AlN | 0.099 |
| 2 | yes | $SiO_2$—$Al_2O_3$ | (1) | whisker | TiC | 0.084 |
| 3 | yes | $SiO_2$—$Al_2O_3$ | (2) | whisker | ZrC | 0.066 |
| 4 | yes | $SiO_2$—$Al_2O_3$ | (3) | plate-like form | SiC | 0.199 |
| 5 | yes | $SiO_2$—$Al_2O_3$ | (4) | plate-like form | $B_4C$ | 0.111 |
| 6 | yes | $SiO_2$—$Al_2O_3$ | (5) | whisker | CrC | 0.084 |
| 7 | yes | $Y_2O_3$—$Al_2O_3$—MgO | (6) | whisker | $Mo_2C$ | 0.155 |
| 8 | yes | $Y_2O_3$—$Al_2O_3$—MgO | (7) | whisker | VC | 0.223 |
| 9 | yes | $Y_2O_3$—$Al_2O_3$—MgO | (8) | die-like form | TaC | 0.090 |
| 10 | yes | $Y_2O_3$—$Al_2O_3$—MgO | (9) | die-like form | NbC | 0.055 |
| 11 | yes | $SiO_2$—$Al_2O_3$ | (10) | whisker | TiN | 0.074 |
| 12 | yes | $SiO_2$—$Al_2O_3$ | (11) | whisker | ZrN | 0.096 |
| 13 | yes | $SiO_2$—$Al_2O_3$ | (12) | plate-like form | $Si_3N_4$ | 0.099 |
| 14 | yes | $SiO_2$—$Al_2O_3$ | (13) | plate-like form | BN | 0.219 |
| 15 | yes | $SiO_2$—$Al_2O_3$ | (14) | whisker | CrN | 0.069 |
| 16 | yes | $Y_2O_3$—$Al_2O_3$—MgO | (15) | whisker | $Mo_2N$ | 0.127 |
| 17 | yes | $Y_2O_3$—$Al_2O_3$—MgO | (16) | whisker | VN | 0.326 |

TABLE 8-continued

| Sample No. | Presence of oxide layer | Kind of oxide layer (system) | Species of gas | Form of deposit | Main deposited phase | Average pore size of filtering part ($\mu$m) |
|---|---|---|---|---|---|---|
| 18 | yes | $Y_2O_3$—$Al_2O_3$—MgO | (17) | die-like form | TaN | 0.077 |
| 19 | yes | $Y_2O_3$—$Al_2O_3$—MgO | (18) | die-like form | NbN | 0.061 |
| 20 | no | $SiO_2$—$Al_2O_3$ | (1) | no deposit | — | — |
| 21 | no | $SiO_2$—$Al_2O_3$ | (2) | no deposit | — | — |
| 22 | no | $SiO_2$—$Al_2O_3$ | (3) | no deposit | — | — |
| 23 | no | $Al_2O_3$—CaO | (19) | no deposit | — | — |
| 24 | no | $SiO_2$—$Al_2O_3$ | (4) | no deposit | — | — |
| 25 | no | $SiO_2$—$Al_2O_3$ | (5) | no deposit | — | — |
| 26 | no | $Y_2O_3$—$Al_2O_3$—MgO | (6) | no deposit | — | — |
| 27 | no | $Y_2O_3$—$Al_2O_3$—MgO | (7) | no deposit | — | — |
| 28 | no | $Y_2O_3$—$Al_2O_3$—MgO | (8) | no deposit | — | — |
| 29 | no | $Y_2O_3$—$Al_2O_3$—MgO | (9) | no deposit | — | — |
| 30 | no | $SiO_2$—$Al_2O_3$ | (10) | no deposit | — | — |
| 31 | no | $SiO_2$—$Al_2O_3$ | (11) | no deposit | — | — |
| 32 | no | $SiO_2$—$Al_2O_3$ | (12) | no deposit | — | — |
| 33 | no | $SiO_2$—$Al_2O_3$ | (13) | no deposit | — | — |
| 34 | no | $SiO_2$—$Al_2O_3$ | (14) | no deposit | — | — |
| 35 | no | $Y_2O_3$—$Al_2O_3$—MgO | (15) | no deposit | — | — |
| 36 | no | $Y_2O_3$—$Al_2O_3$—MgO | (16) | no deposit | — | — |
| 37 | no | $Y_2O_3$—$Al_2O_3$—MgO | (17) | no deposit | — | — |
| 38 | no | $Y_2O_3$—$Al_2O_3$—MgO | (18) | no deposit | — | — |

Note:
Sample Nos. 1–19: Samples of the present invention
Sample Nos. 20–38: Comparative samples

EXAMPLE 8

An agglomeration of silicon nitride fibers (diameter: 0.3 $\mu$m and length: 1 mm) was immersed into an $SiO_2$—$Al_2O_3$ base alkoxide liquid ($SiO_2$:$Al_2O_3$=2:1 by weight), pulled out of the liquid and fired at 500° C. for one hour in the air. The thus fired product was heated with an article prepared by molding an amorphous $Si_3N_4$ powder including $TiO_2$ in an amount of 5 wt.% based on the weight of the amorphous $Si_3N_4$ powder, in nitrogen gas at 1500° C. at 700 Torr for 2 hours.

Fine fibers of 0.008 $\mu$m in diameter and 0.09 $\mu$m were deposited onto the surfaces of the fibers constituting the base.

A powder of $\alpha$-type $Si_3N_4$ of 0.2 $\mu$m in diameter were mixed with $Y_2O_3$ and $Al_2O_3$ in amounts of 2% by weight and 5% by weight, respectively, based on the weight of the powder of $\alpha$-type $Si_3N_4$. To the resultant powder mixture, the fibers obtained above were added in an amount of 5–25% by weight with respect to the weight of the powder mixture, and mixed together. After molding the mixture, the molded body was sintered in nitrogen gas at 1500° C. at 5 atm for 2 hours to provide an $Si_3N_4$ composite reinforced with the finer $Si_3N_4$ whiskers.

The resultant sample was measured for fracture toughness by the Single Edge Precracked Beam Method.

For comparison, samples reinforced with fibers free from the whiskers were evaluated in the same manner as described above.

Table 9 shows the results.

By using the modified fibers of the present invention, the fracture toughness of the composite articles was greatly improved.

TABLE 9

| Sample No. | Addition of fibers (wt. %) | Deposition of whiskers on fibers | Fracture toughness (MPam$^{0.5}$) |
|---|---|---|---|
| 1 | 5 | yes | 5.9 |
| 2 | 10 | yes | 9.3 |
| 3 | 15 | yes | 13.9 |
| 4 | 20 | yes | 15.5 |
| 5 | 25 | yes | 18.8 |
| 6 | 0 | — | 4.5 |
| 7 | 5 | no | 5.6 |
| 8 | 10 | no | 6.7 |
| 9 | 15 | no | 9.8 |
| 10 | 20 | no | 9.9 |
| 11 | 25 | no | 10.2 |

Note:
Sample Nos. 1–5: Samples of the present invention
Sample Nos. 6–11: Comparative samples As described above, since the porous ceramic film of the present invention has an excellent permeability and a high specific surface area, it is very useful as a filter to be used for the collection and filtering of bacteria in liquid or collection of particulate matter contained in gas; bioreactor; and a catalyst support.

When the modified ceramic fibers prepared according to the present invention is used as a reinforcement for a ceramic composite material, it provides a composite material having a very high fracture toughness as compared with the case of using conventional reinforcing fibers and such a composite material is very useful for the production of structural parts.

Further, the inventive coating method utilizing the VLS mechanism can make it possible to provide porous ceramic films having various shapes from various ceramic materials.

What is claimed is:

1. A highly porous ceramic film having good pressure resistance and a regulated pore size which is formed onto and bonded to an oxide layer provided on a surface of a base prior to film formation, the film composed of particles comprising at least one compound including (a) at least one member selected from the group consisting of Si, B and Al or the group consisting of the metals of the Groups IVa, Va, and VIa in the Periodic Table and (b) at least one member selected from the group consisting of C and N in which the particles are intertwined with each other and bonded to each other through a component of the oxide layer to form a three-dimensionally intertwined structure.

2. A porous ceramic film as set forth in claim 1 in which the porosity of the porous ceramic film is at least 40% by volume.

3. A porous ceramic film as set forth in claim 1 in which the porosity of the porous ceramic film ranges from 70 to 90% by volume.

4. A porous ceramic film as set forth in claim 1 in which the average pore size of the porous ceramic film is from 0.001 to 1 µm.

5. A porous ceramic film as set forth in claim 1 in which the average pore size of the porous ceramic film is from 0.001 to 0.1 µm.

6. A porous ceramic film as set forth in claim 1 in which the particles are in the form of fibers or whiskers.

7. A porous ceramic film as set forth in claim 6 in which the aspect ratio of the deposited particles is from 5 to 200.

8. A porous ceramic film as set forth in claim 1 in which the particles each have a plate or die form.

9. A porous ceramic film as set forth in claim 1 in which the particles are each in a dendritic form.

10. A porous ceramic film as set forth in claim 1 in which the specific surface area thereof is 15 $m^2/g$ or above.

11. A porous ceramic film as set forth in claim 1 in which a thickness of the porous ceramic film is 10 to 100 times as large as the average pore size of the same.

12. A porous ceramic film as set forth in claim 1 in which a thickness of the porous ceramic film is 10 to 20 times as large as the average pore size of the same.

13. A porous ceramic film as set forth in claim 1 in which the oxide layer contains Si and O and the particles are comprised of $Si_3N_4$.

14. A porous ceramic film as set forth in claim 13 in which the oxide layer further contains at least one selected from the group consisting of Al and Y.

15. A porous ceramic film as set forth in claim 14 in which the oxide layer further contains at least one selected from the group consisting of the elements of the Groups Ia and IIa.

16. A porous ceramic film as set forth in claim 1 in which the porous ceramic film has a three-dimensional network structure which has a porosity of at least 40% by volume and an average pore size of from 0.1 to 1 µm.

17. A filter prepared by using a highly porous ceramic film of claim 1 having good pressure resistance and a regulated pore size which is formed onto and bonded to an oxide layer provided on a surface of a base prior to film formation, the porous ceramic film being composed of particles comprising at least one compound including (a) at least one member selected from the group consisting of Si, B and Al or the group consisting of the metals of the Groups IVa, Va and VIa of the Periodic Table and (b) at least one member selected from the group consisting of C and N, the particles being intertwined with each other and bonded to each other through a component of the oxide layer to form a three-dimensionally intertwined structure.

18. A structural material prepared by a highly porous ceramic film of claim 1 having good pressure resistance and a regulated pore size which is formed onto and bonded to an oxide layer provided on a surface of a base prior to film formation, the porous ceramic film being composed of particles comprising at least one compound including (a) at least one member selected from the group consisting of Si, B and Al or the group consisting of the metals of the Groups IVa, Va and VIa of the Periodic Table and (b) at least one member selected from the group consisting of C and N, the particles being intertwined with each other and bonded to each other through a component of the oxide layer to form a three-dimensionally intertwined structure.

19. A process for producing a porous ceramic film of claim 1, comprising forming an oxide layer on a surface of a base to provide a coated base; and heating the coated base to a temperature of not lower than the liquid-phase formation temperature of the oxide layer in a gaseous atmosphere containing (a) at least one selected from the group consisting of Si, B and Al or the group consisting of the metals of the Group IVa, Va and VIa and (b) at least one selected from the group consisting of C and N, whereby a porous ceramic film is formed, the porous ceramic film being composed of particles comprising at least one compound including (a) at least one selected from the group consisting of Si, B and Al or the group consisting of the metals of the Group IVa, Va and VIa and (b) at least one selected from the group consisting of C and N, the particles being intertwined with each other and bonded to each other through the component of the oxide layer to form a three-dimensionally intertwined structure.

20. A process as set forth in claim 19 in which after the porous ceramic film is formed, the resultant ceramic film is subjected to heat treating at 900° to 1300° C. in the air or an inert gas atmosphere containing oxygen.

21. A process for producing a porous ceramic film as set forth in claim 19 in which the temperature of not lower than the liquid-phase formation temperature of the oxide layer is 1000° to 1800° C.

22. A process as set forth in claim 19 in which the pressure of the gaseous atmosphere when heating to the temperature of not lower than the liquid-phase formation temperature of the oxide layer is at least 10 Torr.

23. A process as set forth in claim 19 in which the oxide layer contains Si and O and the gaseous atmosphere contains Si and N.

24. A process as set forth in claim 23 in which the source material of the gaseous atmosphere is an amorphous $Si_3N_4$ powder.

25. A process as set forth in claim 23 in which the oxide layer further contains at least one of Al and Y.

26. A process as set forth in claim 25 in which the oxide layer further contains at least one of the elements of the Groups Ia and IIa.

27. A process as set forth in claim 19 in which the oxide layer if formed by applying a solution of a metal alkoxide onto the surface of the base and then firing it in the air or an inert gas atmosphere containing oxygen at a temperature of 200° C. or above.

28. A process as set forth in claim 19 in which the base is in the form of fibers.

* * * * *